United States Patent [19]

Zecher et al.

[11] Patent Number: 4,628,079
[45] Date of Patent: Dec. 9, 1986

[54] POLYAMIDE IMIDES PRODUCED FROM EITHER LACTAMS OR POLYAMIDES WITH ISOCYANATES OR ANHYDRIDES IN WHICH PRODUCTS ARE PRECIPITATED WITH A NON-SOLVENT

[75] Inventors: Wilfried Zecher, Leverkusen; Rolf Dhein, Krefeld; Klaus Reinking, Wermelskirchen, all of Fed. Rep. of Germany

[73] Assignee: Bayer Aktiengesellschaft, Leverkusen, Fed. Rep. of Germany

[21] Appl. No.: 746,715

[22] Filed: Jun. 20, 1985

Related U.S. Application Data

[63] Continuation-in-part of Ser. No. 644,515, Aug. 28, 1984, Pat. No. 4,549,006.

[30] Foreign Application Priority Data

Sep. 6, 1983 [DE] Fed. Rep. of Germany ....... 3332031

[51] Int. Cl.$^4$ ............................................. C08G 18/82
[52] U.S. Cl. ...................................... 528/49; 264/204; 528/73; 528/502
[58] Field of Search .......................... 528/49, 73, 502; 264/204

[56] References Cited

U.S. PATENT DOCUMENTS 3,658,773   4/1972   Zecher et al. .......................... 528/48
3,752,791   8/1973   Zecher et al. ......................... 524/742
4,549,006  10/1985   Zecher et al. .......................... 528/73

Primary Examiner—Maurice J. Welsh
Attorney, Agent, or Firm—Connolly and Hutz

[57] ABSTRACT

This invention relates to the use of polyamide imides as thermoplasts.

10 Claims, No Drawings

POLYAMIDE IMIDES PRODUCED FROM EITHER LACTAMS OR POLYAMIDES WITH ISOCYANATES OR ANHYDRIDES IN WHICH PRODUCTS ARE PRECIPITATED WITH A NON-SOLVENT

This application is a continuation-in-part of U.S. Ser. No. 644515 filed Aug. 28, 1984, now U.S. Pat. No. 4,549,006.

This invention relates to the use of polyamide imides as thermoplasts.

It is known that aliphatic-aromatic polyamide imides produced by reacting polyisocyanates with cyclic polycarboxylic acid anhydrides and lactams (DAS No. 1,770,202) or with polyamides (DAS No. 1,956,512), have certain properties, such as high softening temperatures and good elasticity values, and they may be used as coatings which are resistant to elevated temperatures, for example in the lacquer sector for electrical insulation.

It has now been found that the polymers obtained during the condensation of organic polyisocyanates, such as aliphatic, aliphatic-aromatic and aromatic diisocyanates, with cyclic polycarboxylic acid anhydrides and lactams or polyamides at a temperature of from 0° to 400° C., optionally in a solvent, are thermoplasts which have outstanding properties and which are capable of being processed by injection moulding.

It has also been found that these polymers may be produced, for example in solvents, and may then be concentrated in an evaporation extruder at a temperature of from 250° to 400° C., optionally under vacuum. A particularl embodiment of the present invention relates to the use of polyamide imides as thermoplasts which have been produced using a mixture of from 40 to 95%, by weight, of an aromatic diisocyanate and from 5 to 60%, by weight, of an aliphatic diisocyanate as the isocyanate component.

The polyamide imides which may be used according to the present invention are distinguished by good mechanical values, such as impact strength, tensile strength, E-moduli and dimensional stability under heat. It is surprising that they may be processed at the elevated temperatures which are necessary for extruding and injection moulding polyimides.

In general, where imides are concerned in this area of use only particularly thermally suitable radicals, for example 4,4'-substituted diphenyl ethers, may be used as the imino component. It is also surprising that the present polymers do not become brittle and infusible under these conditions, in particular when they are concentrated in an extruder, as may be observed in the case of reaction products of polyisocyanates and cyclic polycarboxylic acid anhydrides.

Polyisocyanates of the type described in, for example DE-OS No. 1,770,202, may preferably be used for the production of polyamide imides which may be used according to the present invention.

The following are particularly preferred: phosgenated condensates of aniline and formaldehyde having polyphenylene-methylene structures, commercial mixtures of tolyulene diisocyanates, m-phenylenediisocyanate and symmetrical compounds, such as 4,4'-diisocyanato-diphenyl methane, 4,4'-diisocyanatodiphenyl ether, naphthylene-(1,5)-diisocyanate, p-phenylenediisocyanate, 4,4'-diisocyanatodiphenyl-dimethyl methane, analogous hydro-aromatic diisocyanates, such as 4,4'-diisocyanatodicyclohexyl methane, and aliphatic diisocyanates having from 2 to 12 carbon atoms, such as hexamethylene diisocyanate and isophorone diisocyanates.

A particular embodiment comprises using mixtures of from 40 to 95%, by weight, of an aromatic diisocyanate, for example 4,4-diisocyanato-diphenyl methane or 2,4- or 2,6-toluylene diisocyanate, and from 5 to 60%, by weight, of an aliphatic diisocyanate, for example 4,4'-diisocyanato-dicyclohexyl methane, isophorone diisocyanate, hexamethylene diisocyanate or trimethyl-hexamethylene diisocyanate.

Instead of isocyanates, compounds which react as isocyanates under the reaction conditions may also be used, preferably the addition compounds of alcohols, phenols and lactams, for example of phenol, commercial cresol mixtures and caprolactam, or of mixtures of the amines corresponding to the isocyanates, and aliphatic and aromatic carbonic esters, for example carbonic acid diethyl ester, carbonic acid diphenyl ester and ethylene carbonate, which may also already be partially reacted together, or polycarbodiimides and isocyanatoisocyanurates of the abovedescribed polyisocyanates.

Monofunctional isocyanates may also be used to regulate the molecular weight, for example phenyl isocyanate, tolyl isocyanate, cyclohexyl isocyanate, stearyl isocyanate, ω,ω,ω-trifluoroethyl isocyanate and 3,5-trifluoromethylphenyl isocyanate or the corresponding amines.

To produce the polyamide imides which may be used according to the present invention, cyclic polycarboxylic acid anydrides may be used, such as those described in DE-OS No. 1,770,202 and DE-OS No. 2,542,706, preferably polycarboxylic acid anhydrides corresponding to the following general formula (I):

wherein $R^1$ represents an optionally substituted $C_2$–$C_{20}$ aliphatic radical, a $C_5$–$C_{10}$ cycloaliphatic radical, an aliphatic-aromatic radical having from 1 to 10 carbon atoms in the aliphatic part and from 6 to 10 carbon atoms in the aromatic part or an aromatic radical having from 6 to 10 carbon atoms which, in addition to the cyclic anhydride group, carries at least one other cyclic anhydride group or a carboxyl group.

The following are mentioned as examples: butane tetracarboxylic acid dianhydride, cyclopentane tetracarboxylic acid dianhydride, pyromellitic acid dianhydride, benzopheneone tetracarboxylic acid dianhydride and, more preferably, trimellitic acid anhydride.

Instead of carboxylic acid anhydrides, derivatives thereof may be used, such as the alkyl or phenyl esters or the polycarboxylic acids themselves which are converted into the acid anhydrides during the course of the reaction.

In order to regulate the molecular weight, carboxylic acids which react in a monofunctional manner under the reaction conditions are used, for example phthalic acid or anhydrides thereof, benzoic acid or palmitic acid which may also be substituted with alkyl or halogen, such as fluorine or chlorine.

For the production of the polyamide imides which may be used according to the present invention, lactams are used, for example lactams corresponding to the following general formula (II):

(II)

wherein
X represents an integer of from 2 to 20.

Caprolactam is preferably used.

Polyamides may be used instead of or combined with the lactams, that is polyamides of the type described in DAS No. 1,956,512, for example polycapronamide (nylon 6), polydodecanoic acid amide and polyamides of dicarboxylic acids, for example adipic acid, sebacic acid, oxalic acid, dibutylmalonic acid, isophthalic acid and terephthalic acid, and diamines, such as ethylene diamine, hexamethylene diamine, decamethylene diamines and m- and p-phenylene diamine. Polycapronamide (nylon 6) and polyhexamethylene adipamide (nylon 66) are preferably used.

The polyamide imides which may be used according to the present invention may be produced in solvents, as is described in DAS No. 1,770,202. Phenols, such as phenol and commercial mixtures of o-, m- and p-cresols, are preferably used as solvents.

To produce the polyamide imides which may be used according to the present invention, the reaction components are maintained at a temperature of from 0° to 400° C. for from a few minutes to several hours, with or without solvent. The course of the reaction may be followed, for example by means of the evolution of gas, the increase in viscosity and the IR spectrum.

Polyamide imides according to the present invention which have a relatively viscosity, measured using a 1% solution in cresol at 25° C., of from 1.5 to 3.0 mPas., preferably from 1.7 to 2.6 mPas, have proved to be particularly suitable.

It is sometimes advantageous to carry out the reaction in several stages, or to add the individual components in a different sequence or at different temperatures. Thus, the polymer may be produced in a phenolic solvent, then precipitated from the solution by means of a non-solvent, for example methanol, and then possibly re-condensed in an extruder.

In a special embodiment of the invention for example during the production of the polymer in a phenolic solvent (e.g. phenol/technical cresole-mixture) after the polymerisation the reaction mixture is kept for additional 0,5 to 10 hours, preferably 1 to 6 hours at a temperature of 200° to 250° C., preferably 210° to 220° C.

These temperatures can be reached by a partial evaporation of the solvent or by applying a pressure up to about 5 bars.

A preferred embodiment comprises producing the polymer in a solvent, concentrating it, optionally already in the reactor, to produce a solution which is still capable of flowing, or to produce a molten resin, and carrying out the remaining concentration procedure, optionally with secondary condensation, in an evaporation extruder, optionally under vacuum, at a temperature of from 240° to 400° C., preferably from 280° to 340° C.

A further preferred embodiment consists in extracting the concentrated molten resin with a non-solvent such as, for example, methanol or acetone. The process can be carried out by discharging the reaction mixture which has been produced in solution and partially evaporated to a solids content of 40-99% by weight, preferably 65-95% by weight, grinding the resin after it has solidified and extracting it one or more times, optionally after further grinding, with the non-solvent in a ratio of preferably 1:1 to 1:10 and then optionally subsequently condensing the extracted resin in an extruder, compounding and granulating it.

Non-solvents both for the precipitation and for the extraction are, for example, alcohols such as methanol, ethanol, n-propanol, isopropanol, n-, sec.- and tert.-butanol, isobutyl alcohol and hexanol, ketones such as acetone and isobutylmethyl ketone, chlorinated hydrocarbons such as methylene chloride and chloroform, aromatic compounds such as toluene and chlorobenzene and nitriles such as acetonitrile. Methanol and acetone are preferably used.

In general, 1 val of carboxylic acid of cyclic carboxylic acid anhydride is reacted per val of isocyanate, and from 0.5 to 2 vals of lactam or amide are reacted per val of carboxylic acid anhydride, but substantial deviations from these proportions are also possible.

Another possible embodiment comprises reacting excess insocyanate with di- or tri-carboxylic acids, for example adipic acid, terephthalic acid, isophthalic acid or trimesic acid, and reacting excess carboxylic acid with polyhydric alcohols, for example ethylene glycol, neopentyl glycol, hexane diol, trimethylolpropane, trishydroxyethyl isocyanurate, trishydroxyethyl urazole and polyesters having terminal hydroxy groups.

The production of the polymers according to the present invention may be influenced by catalysts, for example by amines, such as triethylamine, 1,4-diazabicyclo-(2,2,2)-octane, N-ethyl-morpholine, N-methyl imidazole and 2-methyl imidazole, by organic and inorganic metal compounds, in particular compounds of iron, lead zinc, tin, copper, cobalt and titanium, such as iron (III)-chloride, cobalt acetate, lead oxide, lead acetate, tin octoate, dibutyl tin dilaurate, copper acetylacetonate, titanium tetrabutylate, alkali metal phenolates and sodium cyanide, and by phosphorus compounds, such as trialkyl phosphine and methyl phospholine oxide.

The present thermoplasts are distinguished by a particular tensile strength, a particular dimensional stability under heat and by particular E moduli. The properties thereof may be varied for the different areas of use by changing the stoichiometric ratios, the degree of condensation and by admixing low and high molecular weight components, such as fillers, pigments, anti-agers, lubricants, plasticizers and other polymers.

COMPARATIVE EXAMPLE A 123.8 g of 4,4'-diisocyanatodiphenyl methane, 1.2 g of phenyl isocyanate and 96 g of trimellitic acid anhydride are introduced into 415 g of phenol/cresol (1:1) and stirred for 2 hours at 170° C., for 2 hours at 190° C. and for 4 hours at 200° C. Condensation takes place with the release of carbon dioxide, 265 g of the solvent mixture are then distilled off under vacuum and the residue is re-condensed for another hour at 215° C. The polyamide imide is obtained as a cloudy, brittle resin having a solids content of 75%, by weight.

A sample of the resin is evaporated in a stream of nitrogen at from 250° to 300° C. The resin change into a friable mass which cannot be melted down so that it is clear even at higher temperatures.

COMPARATIVE EXAMPLE B 96 g of trimellitic acid anhydride, 123.8 g of 4,4'-diisocyanato-diphenylmethane and 1.2 g of phenyl isocyanate are dissolved in 415 g of N-methyl-pyrrolidone, and condensed with stirring to produce the polyamide imide over a period of 4 hours at 80° C., 4 hours at 120° C. and 2 hours at 130° C. The reaction takes place with the evolution of carbon dioxide. The polyamide imide is obtained as a light brown, clear solution having a solids content of about 30%, by weight. The viscosity $\eta^{25}$ is 4700 mPas.

A sample of the polyamide imide solution produced in this manner is evaporated in a stream of nitrogen first of all at 250° C. and then, at 300° C. The polymer sticks to the wall of the evaporator, and is no longer soluble in cresol and dimethylformamide.

EXAMPLE 1

445 g of 4,4'-diisocyanato-diphenylmethane, 348 g of a mixture of 80% of 2,4- and 20% of 2,6-toluylene diisocyanate, 4.76 g of phenyl isocyanate and 384 g of trimellitic acid anhydride are introduced at 120° C. into a solution of 226 g of caprolactam in 920 g of cresol. The condensation to produce the polyamide imide is carried out with stirring over a period of 2 hours at 170° C., 2 hours at 190° C. and 4 hours at 205° C. The solution is then diluted with 1200 g of cresol to produce a solids content of 30%, by weight. The viscosity $\eta^{25}$ of a sample of this solution which was further diluted with cresol to produce a solids content of 15%, by weight, is 350 mPas.

100 g of this solution are evaporated under nitrogen first at 250° C. and then at 300° C. A transparent, elastic resin is obtained having a relative viscosity $\eta$ of 1.86, measured at 25° C. using a 1% solution in cresol.

EXAMPLE 2

33.9 g of polycarponamide (nylon 6) are dissolved in 200 g of cresol and then 100 g of 4,4'-diisocyanato-diphenylmethane, 17.4 g of 2,4-toluylene diisocyanate and 96 g of trimellitic acid anhydride are introduced into the solution. The reaction mixture is stirred for 2 hours at 170° C., for 4 hours at 190° C. and for 4 hours at 205° C. The solution is then diluted to a solids content of about 25%, by weight, using 400 g of cresol. The viscosity $\eta^{25}$ of the condensation product is 800 mPas, measuring using a 15% solution in cresol.

The solution of the polyamide imide is added dropwise to methanol in a ratio of 1:10. A yellow powder is obtained which is melted at 320° C. to produce a clear resin.

EXAMPLE 3

950 g of caprolactam are dissolved in 3750 g of phenol/cresol (1:1), and then 1000 g of 4,4'-diisocyanato-diphenylmethane, 1048 g of 4,4-diisocyanato dicyclohexyl methane and 1536 g of trimellitic acid anhydride are introduced into this solution at from 120° to 130° C. The temperature is increased to 170° C. with stirring and then maintained at this temperature for 2 hours, then increased to and maintained at 190° C. for 2 hours and then at 200° C. for 4 hours. The condensation takes place with the release of carbon dioxide. 2800 g of the solvent are then distilled off under a slight vacuum, and the residue is heated to 210° C. for 1 hour. Upon cooling, a brittle resin is obtained which has a solids content of about 80%, by weight. The resin is then crushed in a cutting mill. The viscosity $\eta^{25}$ of a 15% solution in cresol is 1020 mPas.

The resin produced in this manner is concentrated in a Welding evaporation extruder at a maximum jacket temperature of 320° C. and under a pressure of 130 mbar. A transparent resin is obtained which has a relative viscosity of 2.18, measured using a 1% solution in cresol at 25° C.

This resin is processed by injection moulding at a temperature of about 300° C. to produce test bodies which have an impact strength of 68 kJ/m², a tearing strength of 81 mPas, a tensile E-modulus of 3380 mPas and a Vicat softening temperature of 178° C.

EXAMPLE 4

100 g of 4,4'-diisocyanatodiphenyl methane, 16.8 g of hexamethylene diisocyanate and 96 g of trimellitic acid anhydride are introduced at 120° C. into 185 g of cresol/phenol (1:1) and 56.6 g of caprolactam. The condensation to produce the polyamide imide is carried out with stirring over a period of 2 hours at 170° C., 2 hours at 180° C. and 4 hours at 205° C. 110 g of the solvent mixture are then distilled off under vacuum, and the residue is re-condensed for another hour at 215° C. The polyamide imide is obtained as a brown resin having a solids content of 75%, by weight. The viscosity $\eta^{25}$ of a 15% solution of the resin in cresol is 650 mPas.

A sample of the resin is evaporated in a stream of nitrogen first at 250° C. and then at 300° C. A transparent fusible resin is obtained having a relative viscosity $\eta$ of 2.1.

EXAMPLE 5

247 g of 4,4'-diisocyanatodipheny methane, 262 g of 4,4'-diisocyanatodicyclohexyl methane, 2.38 g of phenyl isocyanate and 348 g of trimellitic acid anhydride are introduced at 120° C. into a solution of 226 g of caprolactam in 770 g of phenol/cresol (1:1). The mixture is then stirred for 2 hours at 170° C., for 2 hours at 190° C. and for 4 hours at 205° C. 530 g of the solvent mixture are then distilled off under vacuum, and the residue is heated to 215° C. for another hour. The polyamide imide is obtained as a brown, brittle resin having a solids content of about 80%, by weight. The viscosity $\eta^{25}$ of a 15% solution in cresol is 860 mPas.

The resin produced in this manner is crushed and concentrated in a ZSK evaporation extruder at a maximum jacket temperature of 320° C. and under a pressure of 400 mbar. A transparent, elastic resin is obtained having a relative viscosity of $\eta$ 2.1, measured using a 1% solution in cresol.

EXAMPLE 6

113 g of caprolactam are introduced into 460 g of phenol/cresol (1:1), followed by the admixture of 120° C. of 200 g of 4,4'-diisocyanatodiphenyl methane, 44.4 g of isophorone diisocyanate and 192 g of trimellitic acid anhydride. The temperature is then increased and the mixture is stirred for 2 hours at 170° C., for 2 hours at 190° C. and for 4 hours at 200° C. 310 g of the solvent mixture are then distilled off. The mixture is then re-condensed at 215° C. for another hour. The polyamide imide is obtained as a brittle, brown resin having a solids content of about 75%, by weight. The viscosity $\eta^{25}$ of a 15% solution in cresol is 660 mPas.

A sample of the resin is evaporated in a stream of nitrogen first at 250° C. and then at 300° C. A fusible and transparent elastic resin is obtained which has a relative viscosity $\eta$ of 2.0.

EXAMPLE 7

890 g of 4,4'-diisocyanatodiphenyl methane, 69.6 g of a mixture of 80% of 2,4- and 20% of 2,6-toluylene diisocyanate, 9.52 g of phenyl isocyanate and 768 g of trimellitic acid anhydride are introduced into a solution of 452 g of caprolactam in 1840 g of phenol/cresol (1:1) at 120° C. The condensation to form the polyamide imide is carried out with stirring over a period of 2 hours at 170° C., 2 hours at 190° C. and 4 hours at 205° C. Then 1360 g of the solvent mixture are distilled off in vacuo and the residue is kept at 220° C. for a further 5 hours for the purpose of subsequent condensation.

When cooled the polyamide imide is obtained in the form of a brittle resin with a solids content of about 80% by weight. The viscosity $\eta^{25}$ of a 15% solution, based on the solids content, of the resin in cresol is 950 mPas.

7.1 A sample of the resin is ground finely and stirred in methanol in a ratio of 1:4 for 6 hours at room temperature. Then the mixture is filtered off and the extraction with methanol is repeated under the same conditions. The polyamide imide is obtained in the form of a yellow powder which is compacted in an extruder at 320° C. and then granulated. The granules are then injection-moulded into mouldings at a mass temperature of 330° C. Elastic transparent test rods with a tensile modulus of 3470 mPas are obtained.

7.2 A ground sample of the 80% polyamide imide resin is extracted twice, as described, with acetone in a ratio of 1:4. The polyamide imide is obtained in the form of a yellow powder. The relative viscosity measured at 25° C. using a 1% solution in cresol, is 1.65. A sample of the resin is melted at 320° C. under nitrogen to form a clear elastic moulding.

7.3 The extraction is carried out twice, as described, with acetonitrile in a ratio of 1:5. A polyamide imide with a relative viscosity of 1.60 is obtained. The powder is melted at 320° C. to form a clear, elastic resin.

EXAMPLE 8

250 g of 4,4'-diisocyanatodiphenyl methane, 1436 g of N-dodecyltrimellitic acid imide and 188.2 g of trimellitic acid anhydride are introduced into a solution of 113 g of caprolactam in 480 g of cresol at 120° C. Then the mixture is stirred for 2 hours at 170° C., 2 hours at 190° C. and 4 hours at 200° C. The condensation to form the polyamide imide is carried out with the elimination of carbon dioxide. Then the polyamide imide is diluted with 2220 g of cresol. A solution of the polyamide imide with a solids content of about 15% by weight and a viscosity $\eta^{25}$ of 610 mPas is obtained.

8.1 The solution of the polyamide imide, which solution is produced as described, is stirred into methanol in a ratio of 1:4. The polyamide imide is obtained in the form of a yellow powder with a relatively viscosity of 1.44, measured at 25° C. using a one-percent solution in cresol. A sample of the powder is melted at 320° C. under nitrogen to form a clear, elastic moulding.

8.2 A sample of the polyamide imide solution according to 2 is stirred into excess acetone in a ratio of 1:5. After separating off the polyamide imide and washing it with acetone it is obtained in the form of a pale yellow powder and is melted at 320° C. under nitrogen to form a transparent elastic material. The resin is soluble in cresol. The relative viscosity $\eta^{25}$ is 2.05.

We claim:

1. A thermoplastic material which comprises polyamide imides produced in a solvent from polyisocyanates, polycarboxylic acid anhydrides and lactams or polyamides, precipitated with a non-solvent and then granulated.

2. A thermoplastic material according to claim 1 wherein the polyamide imides are produced in a solvent and are then concentrated in an evaporation extruder at a temperature of from 250° to 400° C. and condensed out.

3. A thermoplastic material according to claim 1 wherein trimellitic acid anhydride is used as the polycarboxylic acid anhydride.

4. A thermoplastic material according to claim 1 wherein mixtures of from 40 to 95%, by weight, of an aromatic diisocyanate and from 5 to 60%, by weight, of an aliphatic diisocyanate are used as the polyisocyanates.

5. A thermoplastic material according to claim 1 wherein during the production of the polymer in a phenolic solvent after the polymerization the reaction mixture is kept for additional 0.5 to 10 hours at a temperature of 200° to 250° C.

6. A thermoplastic material which comprises polymide imides produced in a solvent from polyisocyanates, polycarboxylic acid anhydrides and lactams or polyamides, extracting the polyamide imide and then granulating the polyamide imide.

7. A thermoplastic material according to claim 6 characterised in that the polyamide imides are produced in a solvent and are then concentrated in an evaporation extruder at a temperature of from 250° to 400° C. and condensed out.

8. A thermoplastic material according to claim 6 wherein trimellitic acid anhydride is used as the polycarboxylic acid anhydride.

9. A thermoplastic material according to claim 6 wherein mixtures of from 40 to 95%, by weight, of an aromatic diisocyanate and from 5 to 60%, by weight, of an aliphatic diisocyanate are used as the polyisocyanates.

10. A thermoplastic material according to claim 6 wherein during the production of the polymer in a phenolic solvent after the polymerization in the reaction mixture is kept for additional 0.5 to 10 hours at a temperature of 200° to 250° C.

* * * * *